US005845530A

United States Patent [19]

Brockmeyer et al.

[11] Patent Number: 5,845,530

[45] Date of Patent: Dec. 8, 1998

[54] CAM AND ROLLER OVERCENTER HANDLE MECHANISM

[75] Inventors: David J. Brockmeyer, Bellevue; Sun Gil Kim, Redmond, both of Wash.

[73] Assignee: The Boeing Company, Seattle, Wash.

[21] Appl. No.: 777,465

[22] Filed: Dec. 30, 1996

[51] Int. Cl.$^{6}$ .............................. F16H 21/44; F16H 53/06

[52] U.S. Cl. ................................................ 74/97.1; 74/569

[58] Field of Search ........................................ 74/97.1, 569

[56] References Cited

U.S. PATENT DOCUMENTS

| | | | |
|---|---|---|---|
| 1,934,917 | 11/1933 | Dorey . | |
| 2,998,272 | 8/1961 | Newcomer, Jr. et al. . | |
| 3,924,884 | 12/1975 | Christie . | |
| 4,749,064 | 6/1988 | Jinno et al. | 74/520 |
| 4,872,368 | 10/1989 | Porter | 74/542 |
| 5,105,673 | 4/1992 | Shibata | 74/97.1 |
| 5,327,797 | 7/1994 | Seifrit, Jr. | 74/512 |

FOREIGN PATENT DOCUMENTS

| | | |
|---|---|---|
| 3-157297 | 7/1991 | Japan . |

*Primary Examiner*—Richard M. Lorence
*Assistant Examiner*—Troy Grabow
*Attorney, Agent, or Firm*—Christensen O'Connor Johnson & Kindness PLLC

[57] ABSTRACT

An overcenter mechanism (10) includes a housing (12) and a first shaft (14) mounted on the housing. The first shaft has a first axis (34). A second shaft (20) is mounted on the housing and the second shaft has a second axis (41) that parallels the first axis. A lever (16) is attached to the first shaft, and the lever pivots about the first axis in response to a force ($F_{op}$) applied to the lever. A cam (18) is attached to the first shaft, and the cam pivots about the first axis. The cam has a cam surface including a first surface portion (58) and a second surface portion (60). The first and second surface portions form a cusp (62) therebetween. A cam follower (21) has a cam follower surface, and the cam follower pivots about the second axis. A biasing member (26) urges the cam follower surface against the cam surface in pressure contact. The cam follower and the pressure contact cooperate with the cam to generate torque ($\tau_{roller}$) on the cam until the cam follower surface contacts the cusp. The pressure contact creates an instability about the cusp when the cusp contacts the cam follower surface, and the torque pivots the cam so the cusp and the cam follower move away from each other.

38 Claims, 6 Drawing Sheets

CAM AND ROLLER OVERCENTER HANDLE MECHANISM

FIELD OF THE INVENTION

The present invention relates to overcenter mechanisms, and more particularly to a cam and roller overcenter handle mechanism.

BACKGROUND OF THE INVENTION

Overcenter mechanisms are used in a wide array of applications where it is desired to reposition a workpiece from a first position to a second position. Applications that use an overcenter mechanism range in complexity from eyeglass frames and light switches to actuator mechanisms for arming and disarming aircraft emergency slides.

A typical overcenter mechanism includes a handle that rotates about a handle shaft, a lever that pivots about the handle shaft, and a spring attached to the lever. FIG. 1 shows a diagram of lever torque generated about the centerline of the handle shaft versus angle of rotation about the handle shaft for a typical overcenter mechanism. When the handle, shaft, and the pivot of the lever are all in line, no net torque is generated about the centerline of the handle shaft. This position is known as “top dead center.” As can be seen in FIG. 1, little lever torque is generated for a wide angular area on both sides of top dead center, making this system more likely to balance in this area due to sources of friction, such as dirt, ice, and contaminants. As the overcenter mechanism approaches top dead center, the operator can use incrementally less force yet still rotate the handle. If no force is applied to the handle at top dead center, the overcenter mechanism can balance at top dead center. Repositioning the overcenter mechanism away from top dead center requires the application of an increased amount of force to the handle to generate net torque about the handle shaft to move to another position. It is therefore desirable to ensure that a given position is“set” by minimizing the likelihood that an overcenter mechanism balances at top dead center.

One attempt to minimize this likelihood entails providing a handle for pivoting a cam follower about an axis. A cam is provided on a cam lever and has a cam surface held in pressure contact with the cam follower by a tension spring attached to the cam lever. The cam surface has a ridge between two concave surfaces. When the handle pivots, the cam follower slides along the cam surface toward the ridge. When the cam follower, the point of the ridge, and the handle axis are all in line, the mechanism is at top dead center. If sufficient rotational torque was already applied to the cam follower, then the cam follower can continue to slide over the ridge. This causes the handle to pivot and move the workpiece. It would be desirable for the ridge to define an angle steep enough to provide instability at top dead center such that the overcenter mechanism does not balance at top dead center. However, because the cam follower is located on the handle, space constraints limit the steepness of the ridge angle and the total range of handle rotation. In this case, the ridge angle is limited by space constraints and the overcenter mechanism can still balance at top dead center.

An attempt may be made to increase spring pressure in attempting to further minimize the likelihood of the overcenter mechanism balancing at top dead center. However, because the steepness of the ridge angle is limited by the space constraints described above, increasing spring pressure merely increases the force necessary to operate the overcenter mechanism and increases corresponding contact stresses. This does not address the problem of the overcenter mechanism balancing at top dead center due to a shallow ridge angle. Thus, the overcenter mechanism can still balance at top dead center.

SUMMARY OF THE INVENTION

The present invention provides an overcenter mechanism with sufficient instability at top dead center to minimize the likelihood that the overcenter mechanism balances at top dead center. The overcenter mechanism includes a housing and a first shaft mounted on the housing. The first shaft has a first axis. A second shaft is mounted on the housing and defines a second axis that parallels the first axis. A cam pivots about the first axis. The cam has a cam surface including a first surface portion and a second surface portion. The first and second surface portions form a cusp between them. A handle lever is attached to the cam, and the handle lever pivots the cam about the first axis in response to a force applied to the handle lever. A cam follower has a cam follower roller surface, and the cam follower pivots about the second axis. A biasing member urges the cam follower roller surface against the cam surface in pressure contact. The cam follower and the pressure contact cooperate with the cam to generate torque on the cam until the cam follower roller surface contacts the cusp. The pressure contact creates an instability about the cusp when the cam follower surface contacts the cusp, and the torque pivots the cam so that the cusp and the cam follower move away from each other.

The overcenter mechanism of the present invention is simple, robust, and reliable. The instability produced at top dead center greatly minimizes the likelihood that the overcenter mechanism balances at top dead center. This design greatly reduces the effects of dirt, ice, and contaminants. The profile of the cam surface can be selected to tailor the torque generated on the cam for any desired application.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
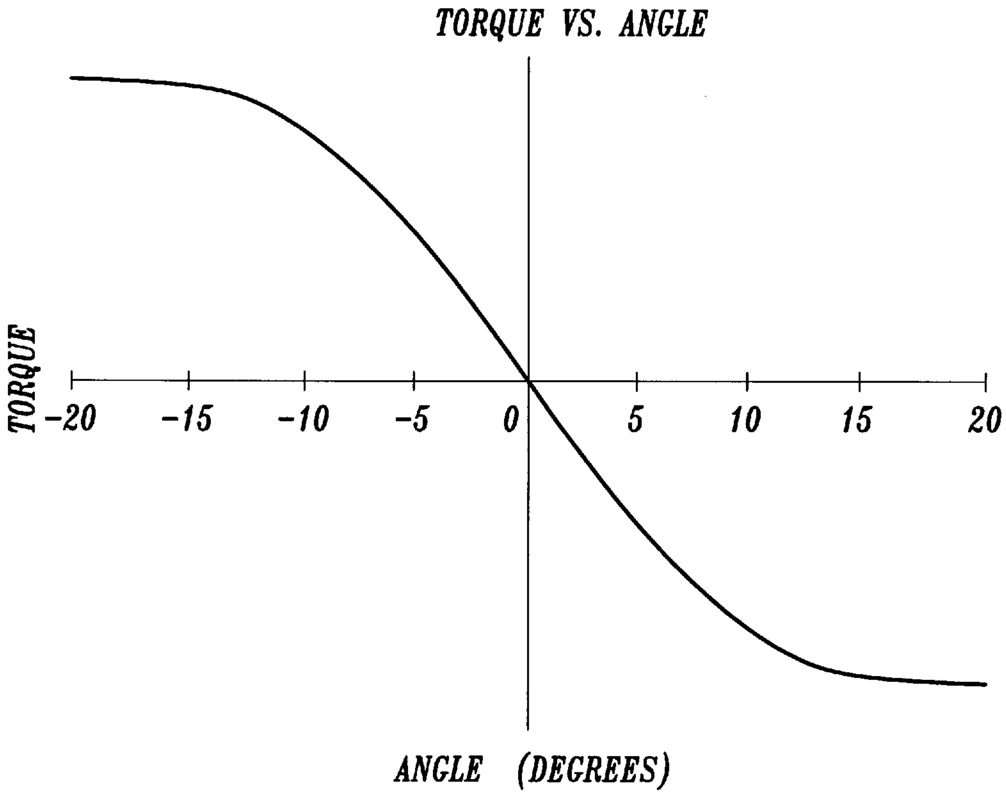
(PRIOR ART) Fig. 1
FIG. 1 is a graph of torque versus angle for a typical prior art overcenter mechanism.
Figure 2:
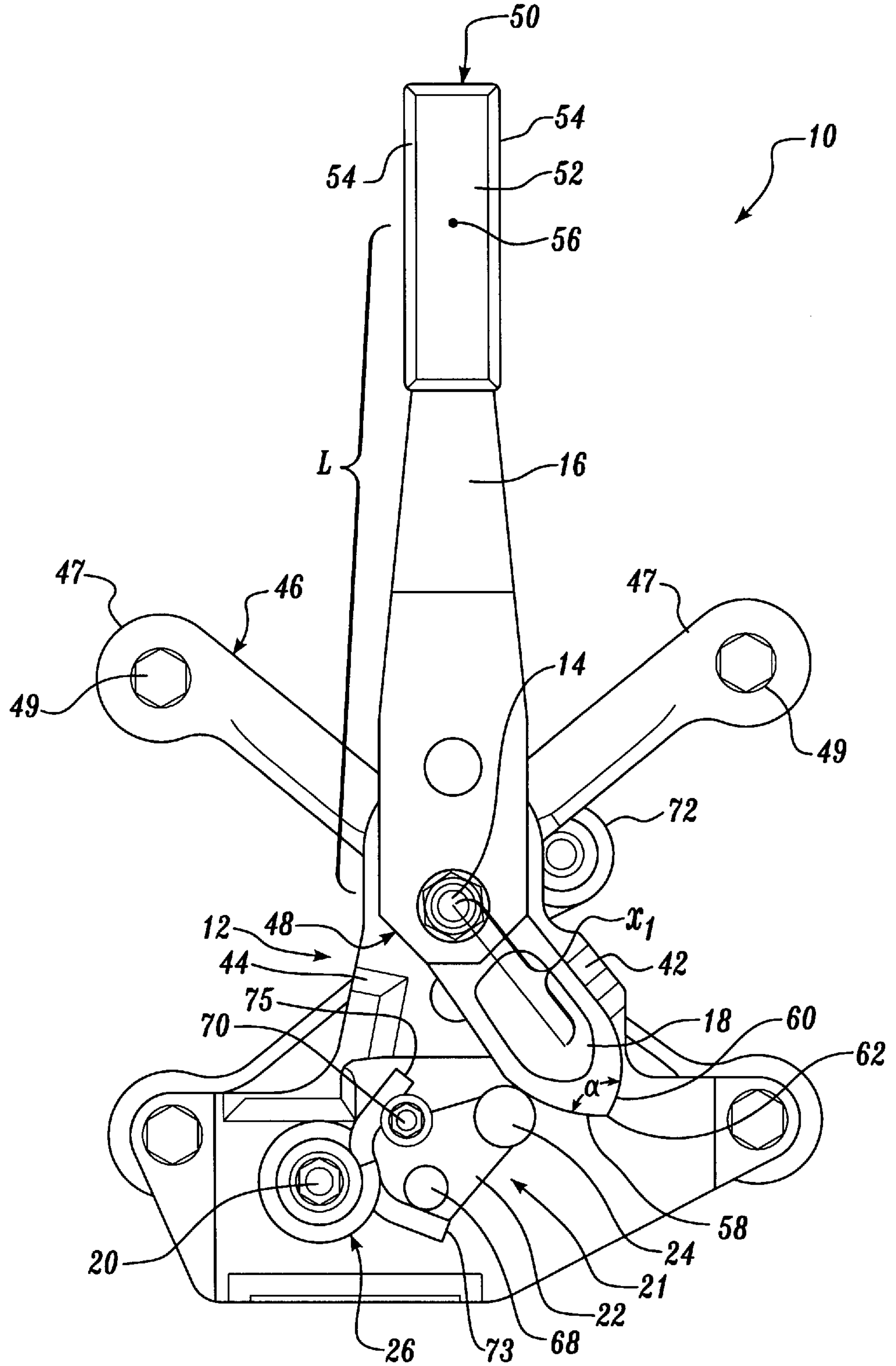
FIG. 2 is a side view of an overcenter mechanism according to the present invention.

FIG. 2 shows a side view of an overcenter mechanism 10 according to the present invention. The overcenter mechanism 10 includes a housing 12, a handle shaft 14, a handle lever 16, a bell crank 18, an offset shaft 20, a cam follower 21, and a biasing member 26. When the handle lever 16 is rotated about the handle shaft 14, the cam follower 21 moves along the bell crank 18 until top dead center is reached, whereupon the biasing member 26 snaps the bell crank 18 past top dead center.

Figure 3:
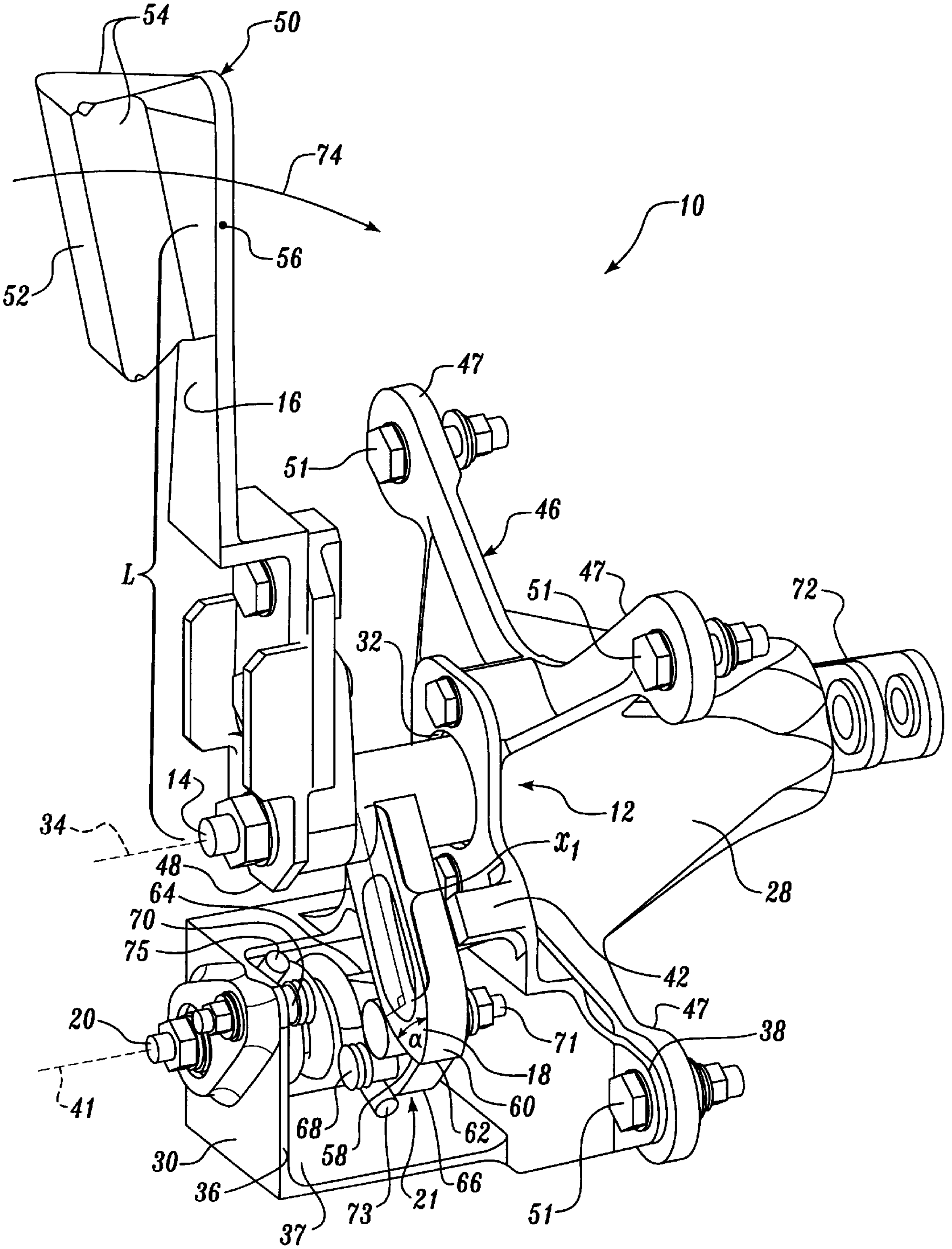
FIG. 3 is an isometric view of the overcenter mechanism of FIG. 2 in a first position.
Figure 4:
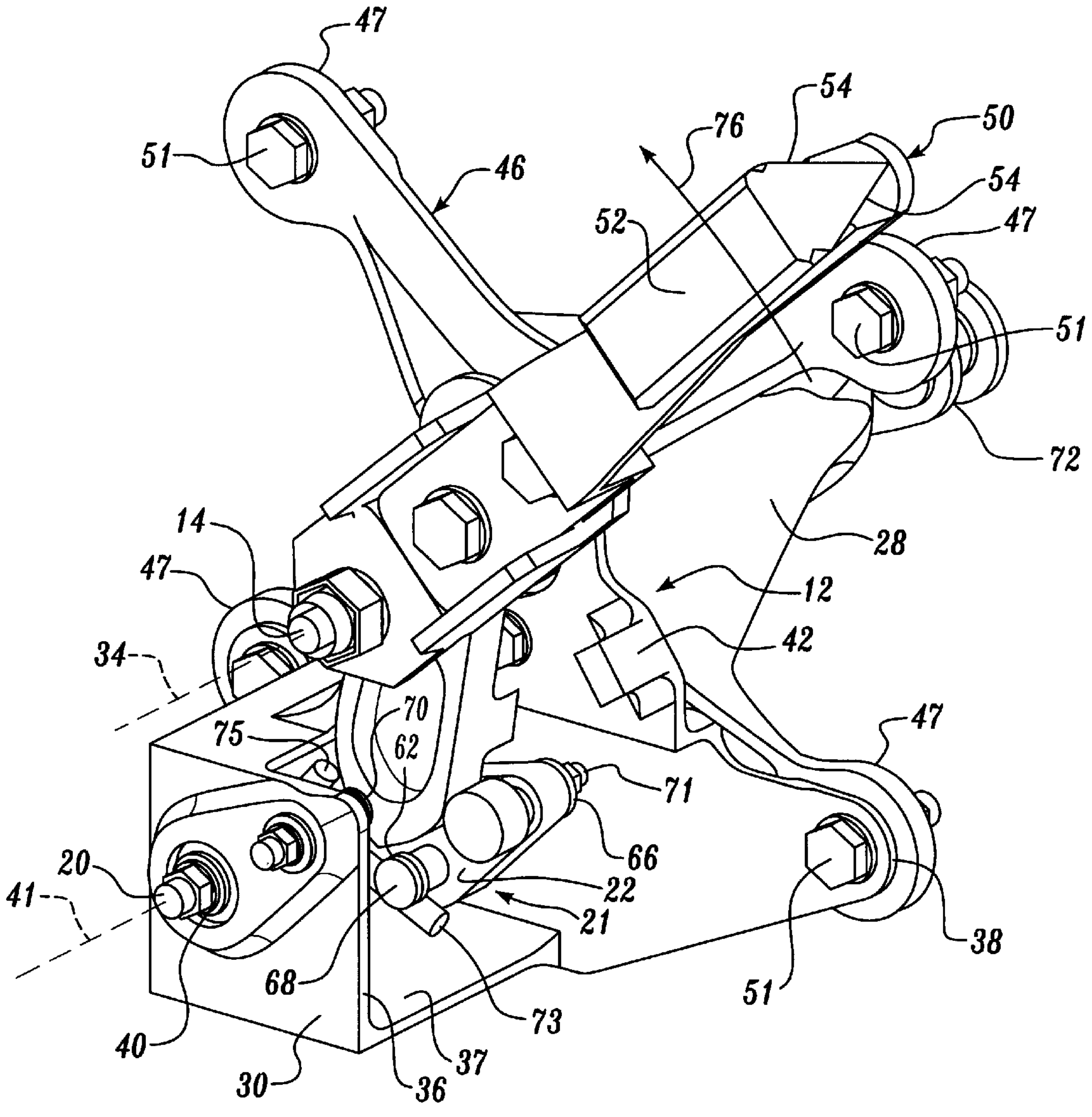
FIG. 4 is another isometric view of the overcenter mechanism of FIG. 2 in a second position, viewed from a different angle than FIG. 3.

Referring now to FIGS. 2, 3, and 4, the housing 12 includes a shaft support housing 28 and an overcenter mechanism housing 30. The shaft support housing 28 includes a chamber 32 for receiving the handle shaft 14. The chamber 32 and the handle shaft 14 have a common longitudinal axis 34. The overcenter mechanism housing 30 includes a first wall 36 and a second wall 38 that opposes and is spaced from the first wall 36. The first and second walls 36 and 38 define a cavity 37 therebetween that receives the overcenter mechanism 10. The first wall 36 includes a first aperture 40 and the second wall 38 includes a second aperture (not shown). The offset shaft 20 is journalled within the first and second apertures. The first aperture 40 and the second aperture (not shown) are aligned such that the longitudinal axis 41 of the offset shaft 20 parallels and is spaced from the axis 34 of the handle shaft 14 and the chamber 32.

The housing 12 also includes a first stop 42 and a second stop 44. The first and second stops 42 and 44 are protrusions that extend from the second wall 38 of the housing 12 into the cavity 37 on opposing sides of the bell crank 18. The first and second stops 42 and 44 each have a surface that is aligned with the bell crank 18 and may be lined with a shock-absorbing material, such as rubber. The housing 12 may also include a mounting bracket 46 that may be suitably adapted to mount the overcenter mechanism 10 for use in a desired application. For example, the overcenter mechanism 10 is suitably used to reposition an actuator mechanism (not shown) for arming and disarming an aircraft emergency slide. In this exemplary application, the mounting bracket 46 includes mounting arms 47 that extend radially from a point proximate the chamber 32 of the housing 12. Each mounting arm 47 includes a hole 49 through which a fastener 51 is inserted to mount the overcenter mechanism 10 to a suitable mounting frame of an aircraft door.

The handle lever 16 includes a first end 48 located adjacent the handle shaft 14 and a second end 50. A grasping handle 52 is attached to the second end 50. The grasping handle 52 suitably includes grasping surfaces 54. A length L is defined along the handle lever 16 from the centerline of the axis 34 to a point 56 on the handle lever 16. The point 56 is located approximately at a midpoint of the grasping handle 52. As will be discussed in detail below, the length L defines a moment arm about the axis 34 when a force is applied to the grasping handle 52.

The bell crank 18 is attached to the handle shaft 14 and is suitably a cam. The cam 18 has a first surface portion 58 and a second surface portion 60, which cooperatively define a compound cam surface. In the preferred embodiment, the first and second surface portions 58 and 60 are elongate and curve arcuately toward each other to define a cam profile including a cusp 62 at the junction of the surface portions 58 and 60. The first and second surface portions 58 and 60 of the preferred embodiment are convex surfaces that form a series of tangent circular arcs. It will be appreciated that the first and second surface portions 58 and 60 may alternately be concave surfaces that meet to form the cusp 62, although this would increase the torque required to move the lever 16 to top dead center.

The cam 18 may be made from any suitable material having high strength and wear characteristics. However, the cam 18 is preferably made from stainless steel in order to withstand high contact stresses. In the presently preferred embodiment, in which the cam 18 is made from stainless steel, the cusp 62 has a radius that is suitably between 0.02 inch and 0.1 inch and is preferably about 0.06 inch. Such a cusp radius provides a steep angle $\alpha$ (FIGS. 2 and 3) between the first and second surface portions 58 and 60 at the cusp 62. In the preferred embodiment, the angle a is less than 90° and is preferably about 80° when the cusp has a radius of about 0.06 inch.

The cam follower 21 includes a cam follower lever 22 and a cam follower roller 24. The cam follower lever 22 has a first end 64 and a second end 66. The first end 64 includes an aperture (not shown) in which the offset shaft 20 is journalled, and the second end 66 includes an aperture (not shown) for mounting of the cam follower roller 24. The cam follower lever 22 includes a first anchor peg 68 that is secured to the lever 22 between the first end 64 and the second end 66. A second anchor peg 70 is attached to the first wall 36 of the overcenter mechanism housing 30. The second anchor peg 70 is oriented to project inwardly toward the first anchor peg 68.

The cam follower roller 24 includes a rotatably attached mounting pin 71 that extends from one of the side surfaces of the roller 24. The mounting pin 71 is rigidly attached within the aperture (not shown) at the second end 66 of the cam follower lever 22. The roller 24 is suitably made of a material having high strength characteristics. The roller 24 is preferably made from stainless steel in order to withstand high contact stresses. When the roller 24 and the cam 18 are both made from stainless steel, the cusp 62 has a radius that is suitably as small as 0.10 inch and is preferably as small as 0.06 inch. It will be appreciated that the cam follower 21 suitably does not necessarily include the cam follower roller 24. Instead, another cam follower having a surface suitably arranged to contact and move along the first and second surface portions 58 and 60 may be used. The cam follower roller 24 is preferably included, however, because it provides a bearing surface with little friction. Rotation of the roller 24 results in dynamic friction, against the first and second surface portions 58 and 60, which is significantly less than dynamic friction generated by a cam follower that does not rotate as it moves along the first and second surface portions 58 and 60. The use of the roller 24 also increases the efficiency of the overcenter mechanism 10 and can extend the useful life of the overcenter mechanism 10.

The biasing member 26 is suitably a spring, and is preferably a helical torsion spring with a high force or torque. The biasing member 26 is anchored to the cam follower lever 22 at the first anchor peg 68 and is anchored to the overcenter mechanism housing 30 at the second anchor peg 70. In the present preferred embodiment, the torsion spring 26 has a first end 73 that is anchored to the first anchor peg 68 and a second end 75 that is anchored to the second anchor peg 70. Between the first and second ends 73 and 75, the torsion spring 26 is coiled around the offset shaft 20. The spring 26, the first anchor peg 68, and the second anchor peg 70 cooperate such that the first end 73 of the spring 26, acting through the first anchor peg 70, urges the cam follower lever 22 to pivot about the axis 41 of the offset shaft 20. This urges the cam follower roller 24 in pressure contact against the first and second surface portions 58 and 60 of the cam 18. The torsion spring 26 is suitably made of steel. In a presently preferred embodiment, the torsion spring 26 is made of titanium in order to provide a high force or torque. It will be appreciated that the biasing member 26 could alternately be fashioned as a tension spring or a compression spring, or a gas cylinder.

The overcenter mechanism 10 includes an output crank 72 (FIGS. 3 and 4). The output crank is suitably attached to the handle shaft 14. The output crank translates motion of the handle shaft 14 to reposition a workpiece (not shown) from one position to another position. It will be appreciated that the output crank could alternately be attached to the cam 18 or the handle lever 16, depending on the desired application.

The overcenter mechanism 10 operates as follows. As shown in FIG. 3, the cam 18 is in a first position against the first stop 42. When it is desired to reposition the cam 18 from the first position to a second position against the second stop 44, and therefore to reposition the workpiece through rotation of the handle shaft 14, an operator grasps the grasping surfaces 54 of the grasping handle 52. The operator applies a force $F_{op}$ in a direction shown by an arrow 74 that is normal to the handle lever 16. The force $F_{op}$ generates a torque about the axis 34 given by the equation:

$$\tau_{handle}=F_{op}\times L \qquad (1)$$

Figure 5:
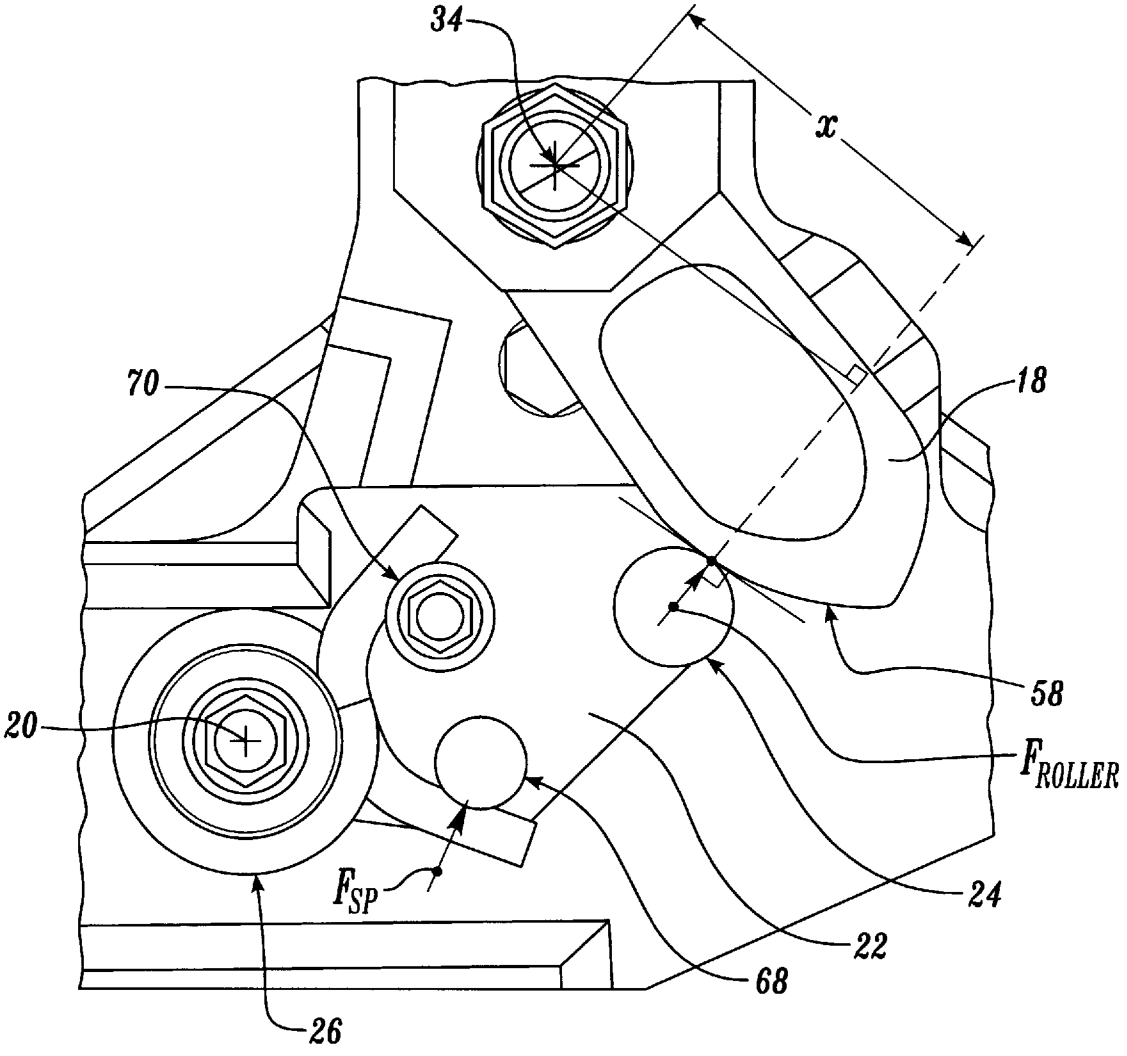
FIG. 5 is a detailed view of the overcenter mechanism of FIG. 2.

FIG. 5 shows that, when wound beyond the free state, the spring 26 exerts a force $F_{sp}$ on the first anchor peg 68 mounted on the cam follower lever 22. The spring force $F_{sp}$ is balanced by an equivalent reaction on the second anchor peg 70 mounted on the wall 36. The spring force $F_{sp}$ causes the cam follower lever 22 to pivot about the offset shaft 20. The cam follower roller 24 transmits the spring force $F_{sp}$ to the cam 18 as a force $F_{roller}$. $F_{roller}$ is defined as a force acting normal to the surface 58 of the cam 18 at the point of contact of the roller 24 (and through the center of the roller 24). The magnitude of the force $F_{roller}$ is sufficient to balance the cam follower lever 22 with an equal and opposite reaction through the roller 24. The torque generated by the force $F_{roller}$ on the cam 18 is given according to the equation:

$$\tau_{roller}=F_{roller}\times X \qquad (2)$$

where a moment arm X is the normal distance between the axis 34 and the vector direction of the force $F_{roller}$.

Referring now to FIGS. 3 and 5, when the cam 18 is in the first position, the roller 24 contacts the first surface portion 58 to define a moment arm $X_1$. The torque generated by the roller 24 on the cam 18 is given according to the equation below:

$$\tau_{roller\ 1}=F_{roller\ 1}\times X_1 \qquad (3)$$

When the torque $\tau_{handle}$ is greater than the torque $\tau_{roller}$, the roller 24 moves along the first surface portion 58 toward the cusp 62. It will be appreciated that the moment arm X decreases from $X_1$ as the roller 24 moves along the first surface portion 58 toward the cusp 62. It will be further appreciated that the spring force $F_{sp}$ increases as the coil of the spring 26 is wound through an angle β (not shown) about the axis 41 of the offset shaft 20. As the spring force $F_{sp}$ increases, the normal force $F_{roller}$ also increases as the roller 24 approaches the cusp 62, due to the profile of the cam 18. The increase in the normal force $F_{roller}$ substantially offsets the decrease in the moment arm X to produce a substantially constant torque.

Figure 6:
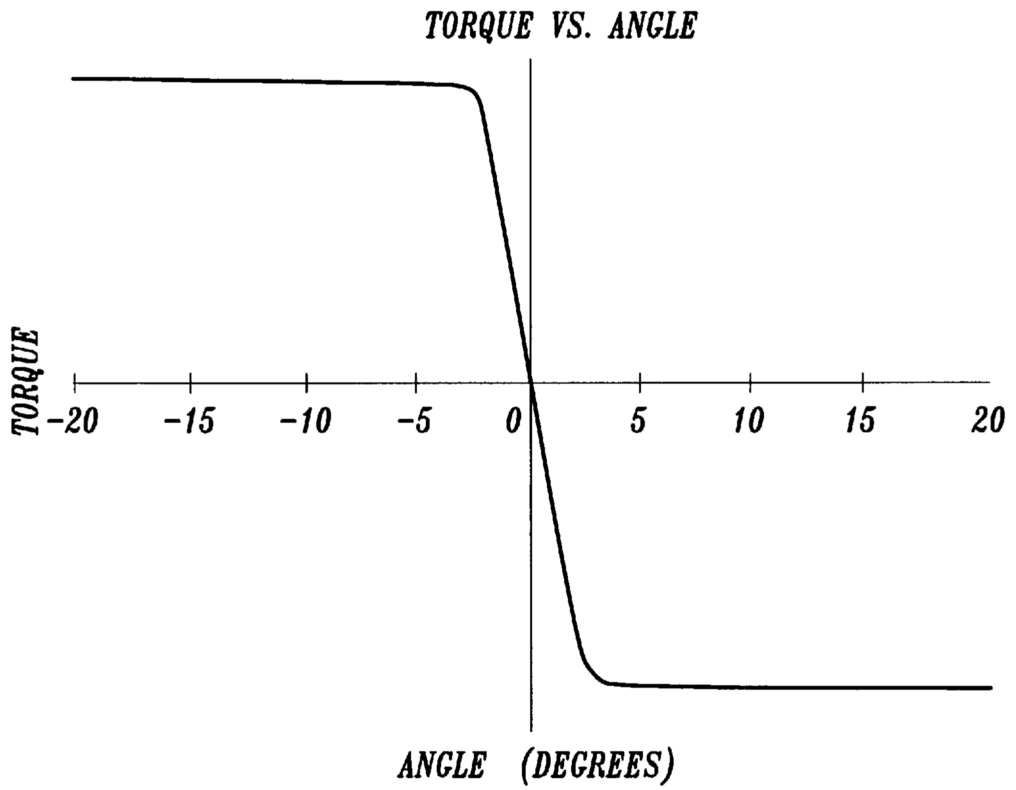
FIG. 6 is a graph of torque versus angle generated by the overcenter mechanism of FIG. 2.

As shown in FIG. 6, the profile of the cam 18 suitably maintains the generation of a substantially constant torque by the roller 24 until the roller 24 approaches the cusp 62. In a presently preferred embodiment in which the cusp 62 has a radius of 0.06 inch, the torque generated by the roller 24 remains substantially constant until the roller contacts the first surface portion 58 within about two degrees of the cusp 62. At this point, the normal force $F_{roller}$ rapidly decreases toward zero. However, when the roller 24 contacts the cusp 62, the spring force $F_{sp}$ is in line with the axis 34. This results in the moment arm X having a magnitude of zero.

When the roller 24 contacts the cusp 62, the overcenter mechanism 10 is at top dead center. The sharpness of the cusp 62, in cooperation with the maximum normal force $F_{roller}$ created by the spring 26, the roller 24, and the cam 18, creates an instability that minimizes the likelihood that the cam 18 and roller 24 will balance at top dead center. The roller 24 moves away from the cusp and contacts the second surface portion 60. The torque $\tau_{roller}$ then snaps the cam 18 beyond top dead center. The cam 18 and the attached handle shaft 14 rotate about the arm 34 until the cam 18 comes to rest at a second position at the second stop 44. With the cam 18 at the second position, the workpiece is now repositioned. In the example shown in FIGS. 3 through 5, the cam 18 travels approximately 45 degrees between the first stop 42 and the second stop 44. It will be appreciated that the cam profile, the locations of axes 34 and 41; and the locations of the first and second stops 42 and 44, respectively, may be selected to permit the amount of desired cam travel and handle lever 16 rotation for a particular application.

Referring now to FIG. 4, it will be appreciated that the overcenter mechanism 10 operates as described above when the handle is rotated along a direction shown by an arrow 76 to reposition the workpiece from the second position to the first position.

While the preferred embodiment of the invention has been illustrated and described, it will be apparent that various changes can be made therein without departing from the spirit and scope of the invention. For example, the profile of the cam 18 can be tailored so that the first and second surface portions 58 and 60 are concave surfaces. In this example, the roller torque increases parabolically as the roller 24 approaches the cusp 62. As another example, the radius of the cusp 62 can be increased, and the angle a increased accordingly, so that the roller torque $\tau_{roller}$ decreases linearly as the roller 24 approaches the cusp. As a further example, the profile of the cam 18 can be tailored to provide a compound torque profile wherein the torque decreases as the overcenter mechanism 10 approaches the first and second stops 42 and 44.

The embodiments of the invention in which an exclusive property or privilege is claimed are defined as follows:

1. An overcenter manually operable actuator comprising:

a housing;

a lever having a handle and mounted on the housing for pivoting about a first axis in response to a force manually applied to the handle, between positions at opposite sides of a central top dead center position;

a cam attached to the lever for swinging about the first axis, the cam having a cam surface including a first surface portion and a second surface portion, the first and second surface portions forming a cusp therebetween;

a cam follower having a cam follower surface, the cam follower pivoting about a second axis parallel to but offset from the first axis; and a biasing member that urges the cam follower surface against the cam surface in pressure contact, the pressure contact cooperating with the cam follower during pivoting of the lever to generate torque on the cam until the cam follower surface approaches the cusp corresponding to the central top dead center position of the lever, the pressure contact creating an instability about the cusp when the cam follower surface contacts the cusp, such that the torque pivots the cam so the cam follower moves away from the cusp, whereby the lever is biased away from the central top dead center position.

2. The overcenter actuator of claim 1, wherein the first and second surface portions define an angle therebetween that is less than ninety degrees.

3. The overcenter actuator of claim 1, wherein the biasing member includes a torsion spring.

4. The overcenter actuator of claim 1, wherein the cam follower includes a roller that defines the cam follower surface.

5. The overcenter actuator of claim 1, wherein the cusp defines a rounded tip having a radius of less than about 0.1 inch.

6. The overcenter actuator of claim 4, wherein the cusp defines a rounded tip having a radius of about 0.06 inch.

7. The overcenter actuator of claim 1, wherein the housing includes a first protrusion that stops pivoting of the cam at a first position and a second protrusion that stops pivoting of the cam at a second position.

8. The overcenter actuator of claim 4, wherein the first and second surface portions each define a convex profile.

9. The overcenter actuator of claim 8, wherein the roller and the pressure contact cooperate with the cam to generate a substantially constant torque until the roller approaches the cusp.

10. An overcenter manually operable actuator comprising:

a housing ;

a lever having a first end portion and a second end portion, the first end portion being pivotally mounted on the housing, the second end portion being arranged for receiving a manually applied force for swinging the lever between positions at opposite sides of a central top dead center position, the lever pivoting about a first axis in response to the manually applied force;

a cam member having a cam surface including a first convex surface portion and a second convex surface portion, the first and second convex surface portions forming a cusp therebetween;

a cam follower member having a cam follower surface, one of the cam and cam follower members being carried by the lever for pivoting about the first axis and the other of the cam and cam follower members being mounted for pivoting about a second axis offset from the first axis; and a biasing member that urges the cam follower surface against the cam surface in pressure contact, the pressure contact cooperating with the cam follower member to pivot the cam member about the first axis when the cusp contacts the cam follower surface corresponding to the central top dead center position of the lever, whereby the lever is biased away from the central top dead center position.

11. The overcenter actuator of claim 10, wherein the cusp includes a tip having a radius of about 0.06 inch.

12. The overcenter actuator of claim 10, wherein the biasing member includes a torsion spring having a first end attached to the cam follower and a second end attached to the housing.

13. The overcenter actuator of claim 10, wherein the cam follower includes a roller that defines the cam follower surface.

14. The overcenter actuator of claim 10, wherein the housing includes a first protrusion that stops pivoting of the cam at the first position, the housing further including a second protrusion that stops pivoting of the cam at a second position.

15. The overcenter actuator of claim 14, wherein the first and second protrusions are arranged so that the cam pivots substantially 45 degrees about the first axis.

16. The overcenter actuator of claim 15, wherein the roller and the pressure contact cooperate with the cam to generate a substantially constant torque until the roller approaches the cusp.

17. The overcenter actuator of claim 10, wherein the biasing member includes a torsion spring.

18. The overcenter actuator of claim 17, wherein the torsion spring is coiled about the second shaft.

19. The overcenter actuator of claim 18, wherein the torsion spring has a first end attached to the cam follower and a second end attached to the housing.

20. An overcenter mechanism comprising:

a housing;

a first shaft mounted on the housing, the first shaft defining a first axis;

a second shaft mounted on the housing, the second shaft defining a second axis that parallels the first axis;

a lever attached to the first shaft, the lever pivoting about the first axis in response to a force applied to the lever;

a cam attached to the first shaft, the cam pivotable about the first axis, the cam having a cam surface including a first surface portion and a second surface portion, the first and second surface portions forming a cusp therebetween;

a cam follower including a roller that defines a cam follower surface, the cam follower pivoting about the second axis; and a biasing member that urges the cam follower surface against the cam surface in pressure contact, the pressure contact cooperating with the cam follower during pivoting of the lever to generate torque on the cam until the cam follower surface approaches the cusp, the pressure contact creating an instability about the cusp when the cam follower surface contacts the cusp, such that the torque pivots the cam so the cam follower moves away from the cusp.

21. The overcenter mechanism of claim 20, wherein the first and second surface portions define an angle therebetween that is less than ninety degrees.

22. The overcenter mechanism of claim 20, wherein the biasing member includes a torsion spring.

23. The overcenter mechanism of claim 20, wherein the cusp defines a rounded tip having a radius of less than about 0.1 inch.

24. The overcenter mechanism of claim 20 wherein the cusp defines a rounded tip having a radius of about .06 inch.

25. The overcenter mechanism of claim 20, wherein the housing includes a first protrusion that stops pivoting of the cam at a first position and a second protrusion that stops pivoting of the cam at a second position.

26. The overcenter mechanism of claim 20, wherein the first and second surface portions each define a convex profile.

27. The overcenter mechanism of claim 26, wherein the roller and the pressure contact cooperate with the cam to generate a substantially constant torque until the roller approaches the cusp.

28. An overcenter mechanism comprising:

a housing having a first shaft mount with a first axis and a second shaft mount with a second axis that parallels the first axis;

a first shaft received within the first shaft mount and being aligned with the first axis;

a second shaft received within the second shaft mount and being aligned with the second axis;

- a lever having a first end and a second end, the first end being attached to the first shaft, the second end being arranged for receiving an applied force, the lever pivoting about the first axis in response to the applied force;
- a cam that is attached to the first shaft, the cam pivoting about the first axis, the cam having a cam surface including a first surface portion and a second surface portion, the first and second surface portions forming a cusp therebetween;
- a cam follower including a roller that defines a cam follower surface, the cam follower pivoting about the second axis; and
- a biasing member that urges the cam follower surface against the cam surface in pressure contact, the pressure contact cooperating with the cam follower to pivot the cam about the first axis when the cusp contacts the cam follower surface.

29. The overcenter mechanism of claim 28, wherein the first and second surface portions each include a concave section, the concave sections meeting to form the cusp therebetween.

30. The overcenter mechanism of claim 28, wherein the cusp includes a tip having a radius of about 0.06 inch.

31. The overcenter mechanism of claim 28, wherein the biasing member includes a torsion spring having a first end attached to the cam follower and a second end attached to the housing lever.

32. The overcenter mechanism of claim 28, wherein the housing includes a first protrusion that stops pivoting of the cam at the first position, the housing further including a second protrusion that stops pivoting of the cam at a second position.

33. The overcenter mechanism of claim 32, wherein the first and second protrusions are arranged so that the cam pivots substantially 90 degrees about the first axis.

34. The overcenter mechanism of claim 33, wherein the roller and the pressure contact cooperate with the cam to generate a substantially constant torque until the roller approaches the cusp.

35. The overcenter mechanism of claim 28, wherein the first and second surface portions each define a convex profile.

36. The overcenter mechanism of claim 28, wherein the biasing member includes a torsion spring.

37. The overcenter mechanism of claim 36, wherein the torsion spring is coiled about the second shaft.

38. The overcenter mechanism of claim 37, wherein the torsion spring has a first end attached to the cam follower and a second end attached to the housing.

* * * * *